March 14, 1933.    G. N. HEIN    1,901,239
INCLOSED BODY FOR AUTOMOBILES
Filed Feb. 23, 1926    2 Sheets-Sheet 1
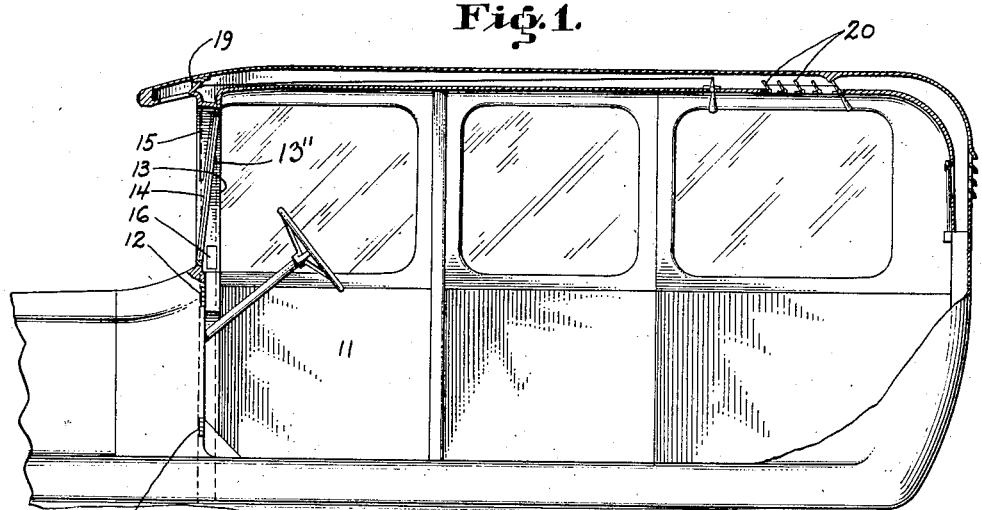
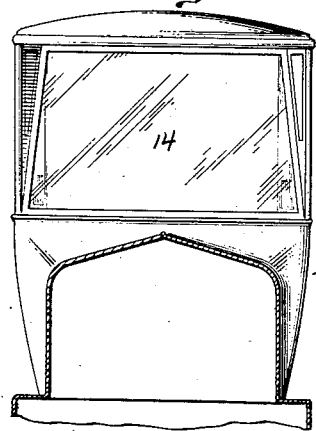
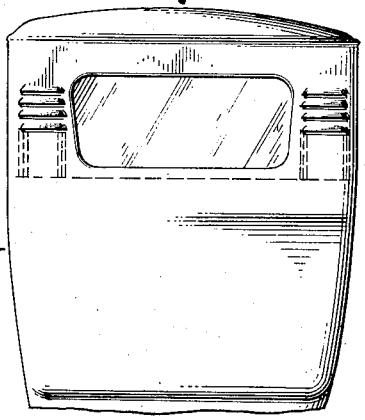
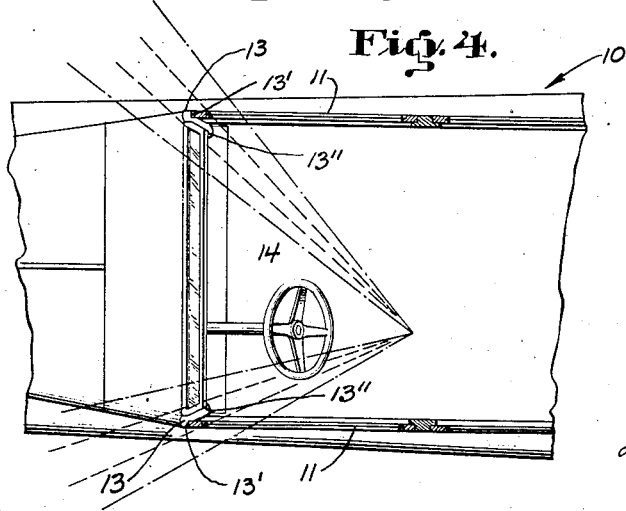
INVENTOR.
George N. Hein
BY
Townsend Loftus & Abbett
ATTORNEYS.

March 14, 1933.  G. N. HEIN  1,901,239
INCLOSED BODY FOR AUTOMOBILES
Filed Feb. 23, 1926    2 Sheets-Sheet 2
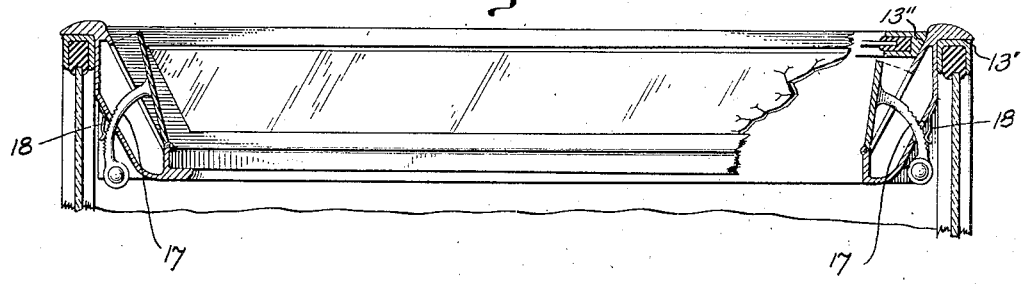
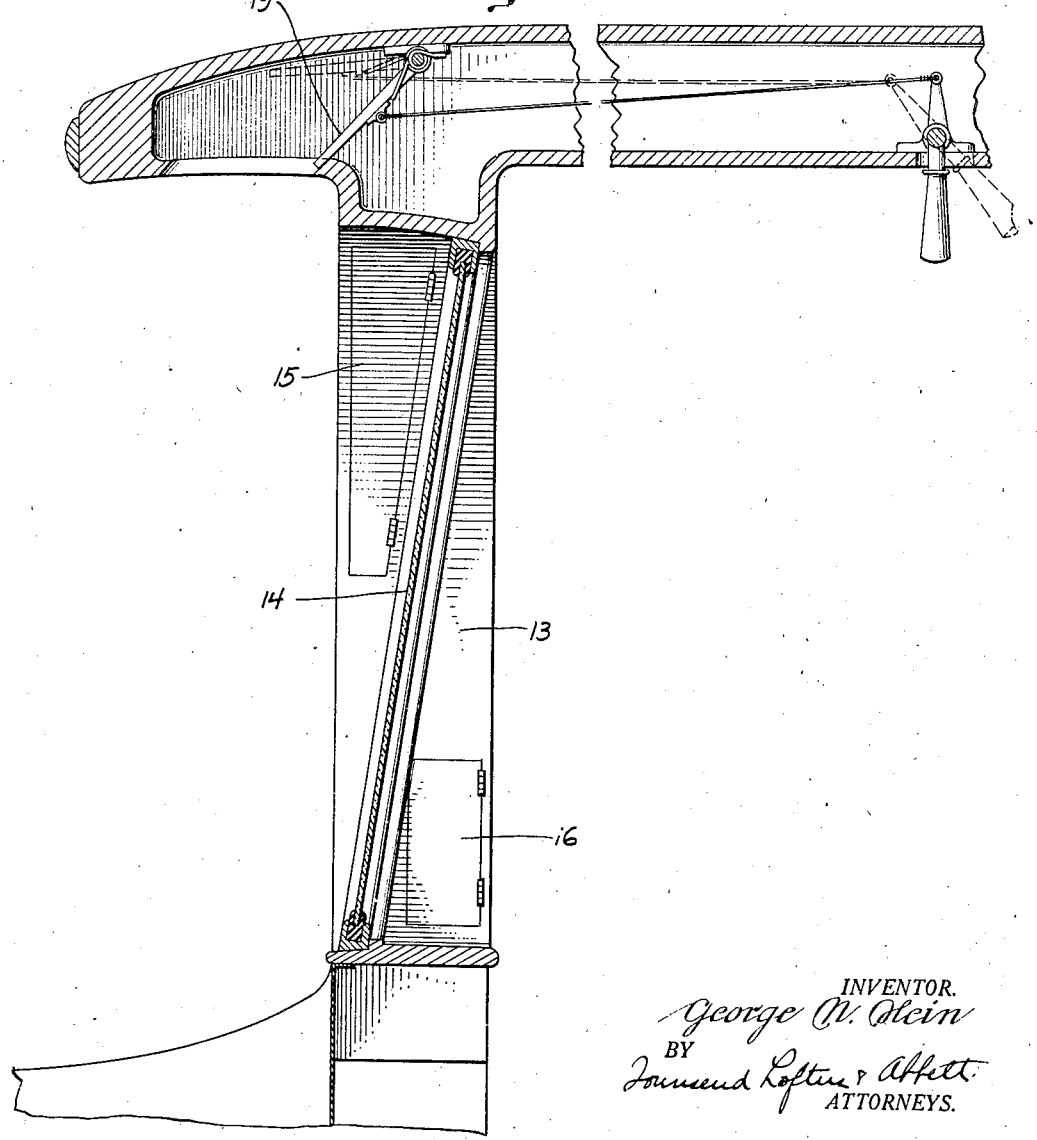
INVENTOR.
George N. Hein
BY
Townsend Loftin & Affett
ATTORNEYS.

Patented Mar. 14, 1933

1,901,239

UNITED STATES PATENT OFFICE

GEORGE N. HEIN, OF SAN FRANCISCO, CALIFORNIA

INCLOSED BODY FOR AUTOMOBILES

Application filed February 23, 1926. Serial No. 89,833.

This invention relates to automobile bodies, and has for its object to provide a closed body with minimum of obstruction to the vision of the driver and capable of equalizing a slanted windshield to further improve the vision.

It is recognized that a slanted windshield affords a clearer vision than a vertical windshield, in that it does not reflect images into the eyes of the driver. It has long been the aim of designers and builders of closed bodies to employ slanted windshields, but no satisfactory method has been suggested for arranging the corner posts and hinging the front doors thereon.

In and by the present invention I accomplish this object by providing a thin, relatively deep corner post, vertically positioned and serving to support a windshield in slanted position thereon and serving also as supports for the upper hinges of the front doors, forming a jamb therefor. By having these posts made relatively thin and extending in the direction of the line of sight of the driver, there is a minimum of obstruction to the vision, and on account of the depth of the posts it becomes possible to position the windshield at a considerable angle from the vertical, or from the plane lying between the two corner posts, thus securing the benefit of a slanted shield.

In the accompanying drawings,

Fig. 1 shows a side elevation partly in section of a body embodying one form of my invention;

Fig. 2 shows a front elevation of the same;

Fig. 3 shows a rear elevation;

Fig. 4 shows a plan view in section of the front portion of the body;

Fig. 5 shows a central vertical sectional view of the front portion of the body;

Fig. 6 shows a plan view in section of the same.

Referring to the drawings, I show a closed body 10 which may embody either one or two seats, with suitable doors 11 mounted on hinges. The front doors are provided with hinges 12, the lower hinges being secured to the lower portion of the body and the upper hinges being secured to corner posts 13. These corner posts are thin and relatively deep, being of elongated cross-sectional area with the major cross-sectional dimensions disposed substantially in the line of vision of the operator; the minor cross-sectional dimensions being viewed by the operator, as represented by broken lines in Fig. 4, so that the post offers very little obstruction to the vision of the driver. Formed in the outer and rearwardly facing surfaces of the corner posts are seats 13' extending from top to bottom along the corner posts and presenting outwardly and rearwardly facing surfaces for closing abutment by a door or other closure. Formed on the inner faces of each of the corner posts is a windshield seat 13", being so disposed and inclined with respect to seats 13' that the windshield supported thereby diverges rearwardly as it extends upwardly from a plane extended between and embracing the rearwardly facing surfaces of the seats 13' of both corner posts, the plane of the windshield intersecting the plane extended between seats 13' at approximately the bottom of the windshield.

A slanted windshield 14 is provided for the front of the body and is made to extend from the outer edge of the bottom to the inner edge of the top of the posts. The front corner posts are provided with inclined ribs to form the windshield seats 13", as indicated in Fig. 5, and these seats on the opposing inner faces or the inner sides of the corner posts converge upwardly so that the resulting windshield space is such as to accommodate a windshield of trapezoidal design, as will be observed in Figs. 2, 4 and 6. If desired these posts may be made hollow and used for ventilating purposes, by providing a door 15 in the upper portion of the windshield, and a door 16 in the lower portion, behind the windshield. These doors can be manipulated from inside the body, and held in various positions by toothed racks 17 co-operating with spring latches 18. Ventilation for the rear compartment of the body can be provided through the roof of the body, where a gate 19 at the front controls admission of air to the space between the walls of the roof and shutters 20 are provided for admitting air to the interior of the body.

Various changes in the construction and arrangement of the several parts may be employed without departing from the spirit of my invention as disclosed in the appended claims.

Having thus described my invention, what I claim as new and desire to secure by Letters Patent is:

1. In a body construction of the class described, front hollow corner posts of substantially elongated cross-section with its longer dimension disposed in the direction of the line of vision of the driver, means for supporting an inclined windshield between said posts, and ventilation controlling means located on opposite sides of the windshield near the upper and lower ends of the post for causing air to pass through said post into the body.

2. A body construction for motor vehicles comprising a body, a pair of corner posts of elongated cross sectional area arranged with the major cross sectional dimensions disposed in the line of vision of the operator, doors engaging the forward portions of the rear surfaces of said corner posts along vertical lines, and a rearwardly inclined windshield of trapezoidal configuration disposed between said corner posts and engaging the forward faces thereof along diagonal lines, whereby the line of contact thereof with each corner post is disposed substantially in a vertical plane containing the point of vision of the operator and the line of contact between the adjacent door and said corner post and to the rear of said last mentioned line of contact.

3. An inclosed body for motor vehicles comprising a body, a top therefor, a door on each side of said body hinged to said body, a front corner post of elongated cross sectional area disposed with its major cross sectional dimension in the line of vision of the operator and extending from said body to said top and inclined rearwardly from the axis of the hinge connection between said door and said body, and a windshield of trapezoidal configuration supported between said corner posts in a rearwardly inclined position.

4. In a body construction for motor vehicles, spaced substantially upright corner posts, each post having on its outer side a rearwardly facing substantially upright seat for a side closure, and each post having on its inner side a windshield seat for a windshield, the windshield seats at the bottom portions thereof being in substantially transverse alignment with said substantially upright seats and diverging rearwardly from transverse alignment with the substantially upright seats at the upper portions thereof, for supporting the windshield at an inclination with respect to said corner posts and said substantially upright seats.

5. In a body construction for motor vehicles, spaced corner posts of substantially elongated cross-section with their longer cross-sectional dimensions disposed in substantially the lines of vision of the driver, seats formed in the front portions of the outer faces of said corner posts, and inclined windshield seats on the inner faces of the posts, said inclined seats being so inclined that the plane of the windshield supported thereby diverges rearwardly, as it extends upwardly, from the plane of said seats formed on the outer faces of the corner posts.

6. In a body construction for motor vehicles, a pair of corner posts of elongated cross-sectional area with the major cross-sectional dimensions disposed substantially in the line of vision of the operator, a substantially upright seat for a closure formed in a rearwardly facing surface of each of the corner posts, a second seat formed on an inner surface of each of said corner posts for supporting a windshield, said second seats being so disposed relative to the first seats that the plane of the windshield supported thereby will be inclined rearwardly from the plane extended between said first seats, and so that the upper portion of the windshield is disposed rearwardly of said last mentioned plane.

GEORGE N. HEIN.